(12) United States Patent
Teng et al.

(10) Patent No.: US 10,259,384 B2
(45) Date of Patent: Apr. 16, 2019

(54) DUAL GRAPHICS LABEL FOR AN INPUT AREA OF CONTROL DEVICE

(71) Applicant: Continental Automotive GmbH, Hannover (DE)

(72) Inventors: Ling Chih Daniel Teng, Singapore (SG); Leonardus Novianto Depari, Singapore (SG)

(73) Assignee: Continental Automotive GmbH, Hannover (DE)

( * ) Notice: Subject to any disclaimer, the term of this patent is extended or adjusted under 35 U.S.C. 154(b) by 345 days.

(21) Appl. No.: 15/029,567

(22) PCT Filed: Oct. 14, 2013

(86) PCT No.: PCT/IB2013/059336
§ 371 (c)(1),
(2) Date: Apr. 14, 2016

(87) PCT Pub. No.: WO2015/056046
PCT Pub. Date: Apr. 23, 2015

(65) Prior Publication Data
US 2016/0272111 A1    Sep. 22, 2016

(51) Int. Cl.
*B60Q 3/00* (2017.01)
*B60Q 3/14* (2017.01)
(Continued)

(52) U.S. Cl.
CPC ............... *B60Q 3/14* (2017.02); *B60K 37/06* (2013.01); *F21V 3/02* (2013.01); *F21V 5/04* (2013.01);
(Continued)

(58) Field of Classification Search
CPC .. B60Q 3/14; B60K 37/06; B60K 2350/2039; B60K 2350/2021; B60K 2350/2095;
(Continued)

(56) References Cited

U.S. PATENT DOCUMENTS 5,555,161 A    9/1996    Roe et al.
6,417,779 B1   7/2002    Noll et al.
(Continued)

FOREIGN PATENT DOCUMENTS

| | | |
|---|---|---|
| EP | 2544072 | 1/2013 |
| JP | 2001-100679 | 4/2001 |
| JP | 2007106392 | 4/2007 |
| JP | 2010-064670 | 3/2010 |

OTHER PUBLICATIONS

Search Report dated Jun. 1, 2017 which issued in the corresponding European Patent Application No. 13895674.3.

*Primary Examiner* — Y M. Lee
(74) *Attorney, Agent, or Firm* — Cozen O'Connor

(57) ABSTRACT

A dual graphic label for an input element of a control device for selectively displaying a first graphic information and a second graphic information includes a first light source, a second light source, an optical masking shield, a light conducting body, and a display face. The optical masking shield has a light blocking surface with a light permeable area in a shape of the first graphic information. The light conducting body has a surface with a light diffusion area in a shape of the second graphic information. The first light source emits a first light ray and the second light source emits a second light ray. The optical masking shield is arranged between the first light source and the light conducting body, and the light conducting body is arranged between the display face and the optical masking shield.

16 Claims, 17 Drawing Sheets

(51) Int. Cl.
*H01H 9/18* (2006.01)
*F21V 3/02* (2006.01)
*F21V 5/04* (2006.01)
*F21V 8/00* (2006.01)
*B60K 37/06* (2006.01)
*G09G 3/04* (2006.01)

(52) U.S. Cl.
CPC ............ *G02B 6/0001* (2013.01); *H01H 9/181* (2013.01); *B60K 2350/2021* (2013.01); *B60K 2350/2039* (2013.01); *B60K 2350/2095* (2013.01); *G09G 3/045* (2013.01)

(58) Field of Classification Search
CPC ....... B60K 2350/203; F21V 3/02; F21V 5/04; G02B 6/0001; H01H 9/181; H01H 9/182; G09G 3/045
See application file for complete search history.

(56) References Cited

U.S. PATENT DOCUMENTS

| | | |
|---|---|---|
| 6,422,710 B1 | 7/2002 | Herzog et al. |
| 7,581,342 B2 | 9/2009 | Egami et al. |
| 8,872,639 B2 | 10/2014 | Kinoshita et al. |
| 2007/0047215 A1 | 3/2007 | Egami et al. |
| 2009/0161388 A1 | 6/2009 | Kato et al. |
| 2010/0142211 A1* | 6/2010 | Boelstler .................. B60Q 3/14 362/355 |
| 2011/0029185 A1 | 2/2011 | Aoki et al. |
| 2011/0273900 A1* | 11/2011 | Li ...................... G02B 19/0019 362/555 |
| 2012/0200475 A1 | 8/2012 | Baker et al. |
| 2013/0135237 A1 | 5/2013 | Li et al. |
| 2014/0185275 A1* | 7/2014 | Smith, III ................. F21V 9/00 362/103 |

* cited by examiner

DUAL GRAPHICS LABEL FOR AN INPUT AREA OF CONTROL DEVICE

CROSS-REFERENCE TO RELATED APPLICATION

This is a U.S. national stage of application No. PCT/IB2013/059336, filed on 14 Oct. 2013, the content of which is incorporated herein by reference.

BACKGROUND OF THE INVENTION

1. Field of the Invention

The application relates to an input area of a control device that shows dual graphic patterns. In particular, the application relates to a control device for a faceplate or a center console of a vehicle, wherein the control device selectively shows dual graphic patterns.

2. Related Art

A motor vehicle often has control panels with input areas for controlling elements of the vehicle, such as cooling parameters, heating parameters, parameters as well as vehicle warning signals and vehicle operating states. The input areas have switches or otherwise sensitive areas that receive an input operation of the driver of the vehicle.

In order to decrease the number of input areas, one would seek to provide two different switching functions to one input area, providing dual graphic labels for indicating the current functions of the input areas.

In order to avoid leakage of light between the adjacent control panels, which impairs the readability of the control panel, each control panel has a dedicated light source with a focusing hood, which prevents the abovementioned leakage of light.

The recent use of driving aids, such as antiskid systems, occupant airbags, and traction control devices, which have risen considerably, has necessitated a correspondingly high number of control panels. This has rendered necessary a large area for mounting the control panels.

Vehicle manufacturers have used different methods to reduce the number of the control panels. The methods include a method that uses a touch screen to serve as control panels. In another method, display units with soft-keys buttons are used to act as control panels. In a further method, buttons with dual selective graphic displays are used to serve as control panels.

U.S. Pat. No. 7,581,342 B2 discloses a display device. The display device includes an ultraviolet light source, a color light source, and a filter that is selectively hit by lights from these sources. The filter has a first area part, a second area part, and a third display part. A portion of the first area part overlaps a portion of the second area part.

In particular, the first area part that excludes its overlapped parts is provided for displaying first display contents when the ultraviolet light is emitted. When the ultraviolet light hits the first area part, the first area part produces visible light. The first area part blocks the color light.

The second area part that excludes its overlapped part is provided for displaying second display contents when the color light is emitted. The second area part allows the ultraviolet and color lights to pass through.

The third display part is provided for displaying the overlapped parts when one of the ultraviolet and color light is emitted. The third display part allows the ultraviolet and color lights to pass through and produces the visible light when the ultraviolet light hits the third display part.

U.S. Pat. No. 6,417,779 B1 discloses a display for a motor vehicle. The display has a transilluminable display panel with an illuminating device. The illuminating device is arranged on the rear side of the display panel such that the illuminating device is averted from an observer while transilluminating the display panel. In order to create a compact display, the illuminating device can emit light of a first and/or a second wavelength region. The light of the first wavelength region can essentially pass through only a first region of the display panel while the light of the second wavelength region can essentially pass through only a second region of the display panel, wherein the second region differs at least partially from the first region of the display panel.

SUMMARY OF THE INVENTION

It is an object of the application to provide an improved dual graphic label for an input element of a control device.

The application provides a dual graphic label for an input element of a control device. The control device can be an antiskid systems, occupant airbag control module and/or a traction control module of a vehicle.

The dual graphic label is provided for selectively displaying a first graphic information and a second graphic information of a component of a vehicle, which is related to the input element. The center stack is also called a center console.

The center stack refers to a cover or to a surface for displaying a status of a component of the vehicle, such as an engine status, a window status, and an audio system status. The cover can also serve to receive an input from a user. The cover is positioned inside the vehicle, usually in a center of a front part of the vehicle, between a dashboard and a transmission of the vehicle, even though it can also be positioned in a rear part of the vehicle.

The graphic information, as an example, can relate to an engine status of the vehicle. The graphic information can include a symbol, an alphabet, and a number for displaying the engine status.

Referring to the dual graphic label, it includes a first light source, a second light source, an optical masking shield, a light conducting body, and a display face, such as black panel or a smoked glass.

In particular, the optical masking shield includes a light blocking surface with a light permeable area in a shape of the first graphic information.

The light conducting body includes a surface with a light diffusion area in a shape of the second graphic information.

The optical masking shield is provided between the first light source and the light conducting body, while the light conducting body is provided between the display face and the optical masking shield.

When energized, the first light source emits a first light ray.

A portion of the first light ray travels from the first light source to hit or to illuminate the light blocking surface of the optical masking shield, wherein the light blocking surface blocks the first light ray from travelling through the light blocking surface.

In contrast, another portion of the first light ray travels from the first light source to hit the light permeable area of the optical masking shield, wherein the light permeable area allows the first light ray to travel through the light permeable area. This first light ray travels so as to pass through the light permeable area with the shape of the first graphic information, which is the shape of the light permeable area.

This transmitted first light ray then travels to the light conducting body, passes through the light conducting body, and then travels to the display face for illuminating the display face with the shape of the first graphic information.

Similarly, when energized, the second light source emits a second light ray.

The second light ray travels from the second light source to the light conducting body. A portion of second light ray later travels through the light diffusion area. The portion of the second light ray that travels through the light diffusion area has the shape of the second graphic information, which is the shape of the light diffusion area.

The second light ray later travels to the display face for illuminating the display face with the shape of the second graphic information.

The display face provides an area, which is illuminated by the first light ray or by the second light ray, for displaying the first and the second graphic information to a user.

This dual graphic label has an advantage in that it can be produced easily at a low cost.

In practice, the light permeable area is often provided by a hollow opening or by a light transparent sheet, such as a clear glass or plastic sheet. The surface of the light conducting body often includes a smooth area that surrounds the light diffusion area. The smooth area does not allow the second light ray to exit the light conducting body, in other words, the smooth area enables total internal reflection of second light ray. The smooth area can allow the first light ray to enter or exit the light conducting body.

A first portion of the display face, which is illuminated by the first light ray with the shape of the first graphic information, can overlap a second portion of the display face, which is illuminated by the second light ray with the shape of the second graphic information. This overlap has a benefit of saving display space, which is important for space constraint areas like the interior of a vehicle.

In one implementation, the color of the first light ray and the color of the second light ray are the same for easy viewing.

In another implementation, the color of the first light ray and the color of the second light ray are different for showing different status.

Different ways of placing the light diffusion area are possible. In one aspect of the application, the light diffusion area faces the light permeable area.

The dual graphic label often includes a controller for selectively energizing the first light source and selectively energizing the second light source.

Each of the first and the second light sources can include one or more light emitting diodes (LEDs) for emitting light rays.

The dual graphic label can also include a light guiding unit placed between the second light source and the light conducting body for guiding or channeling a light ray from the second light source to the light conducting body.

Different ways of implementing the light diffusion area are possible.

In one implementation, the light diffusion area comprises an etched area. A portion of a surface of the light conducting body can be etched by a chemical to serve as the etched area.

In another implementation, the light diffusion area includes a light diffusion sheet or film that is attached or pasted to a surface of the light conducting body.

The display face is provided by a smoked optical element such as a smoked sheet and a smoked lens. The smoked sheet comprises flat surfaces that allow a light ray to transmit without magnifying an image of the light ray. In contrast, the smoked lens includes a curve surface that allows a light ray to transmit while magnifying an image of the light ray.

The display face often light ray scattering elements for scattering a light ray that passes through the display face in several directions to produce a wide radiation pattern of the light ray.

The application also provides an input element of a control device.

The input element includes the above dual graphic label as well as an input element for receiving a user input. The dual graphic label displays dual graphic information while a user can provide an input to the input element according to the displayed graphic information.

In one aspect of the application, the input element includes a mechanical button that is provided inside the dual graphic label for receiving an actuation by a user when the display face is pushed by the user.

In one implementation, the button and the optical masking shield are provided as one integrated unit, although other implementations are possible.

In another aspect of the application, the input element includes a capacitive touch sensor that is provided inside the dual graphic label for detecting an actuation by a user when the display face is pushed by the user. As an example, the capacitive touch sensor can be provided between the display face and the optical masking shield.

The application also provides a faceplate or a center plate for a vehicle. The center plate is also called a center console. The faceplate is intended for placing inside the vehicle and it includes one or more of the above-mentioned input elements. Each input element has a dual graphic label and an input element.

In use, the dual graphic label selectively displays a first graphic information and a second graphic information of a component of the vehicle to a user of the vehicle. Examples of the vehicle component include a heating device, a cooling device, an engine control module, and a transmission control module. A user can then provide input by the input element according the graphic information of the dual graphic label.

The application provides a vehicle. The vehicle includes a two or more components and the above faceplate. The faceplate is provided inside the vehicle. The faceplate includes one or more input units. Each input unit is provided for selectively displaying a first graphic information and a second graphic information of one component of the vehicle to a user of the vehicle and is provided for receiving a user input regarding the component.

DETAILED DESCRIPTION OF THE PRESENTLY PREFERRED EMBODIMENTS

In the following description, details are provided to describe embodiments of the application. It shall be apparent to one skilled in the art, however, that the embodiments may be practiced without such details.

Some parts of the embodiments have similar parts. The similar parts may have the same names or similar part numbers. The description of one part also applies by reference to another similar part, where appropriate, thereby reducing repetition of text without limiting the disclosure.

Figure 1:
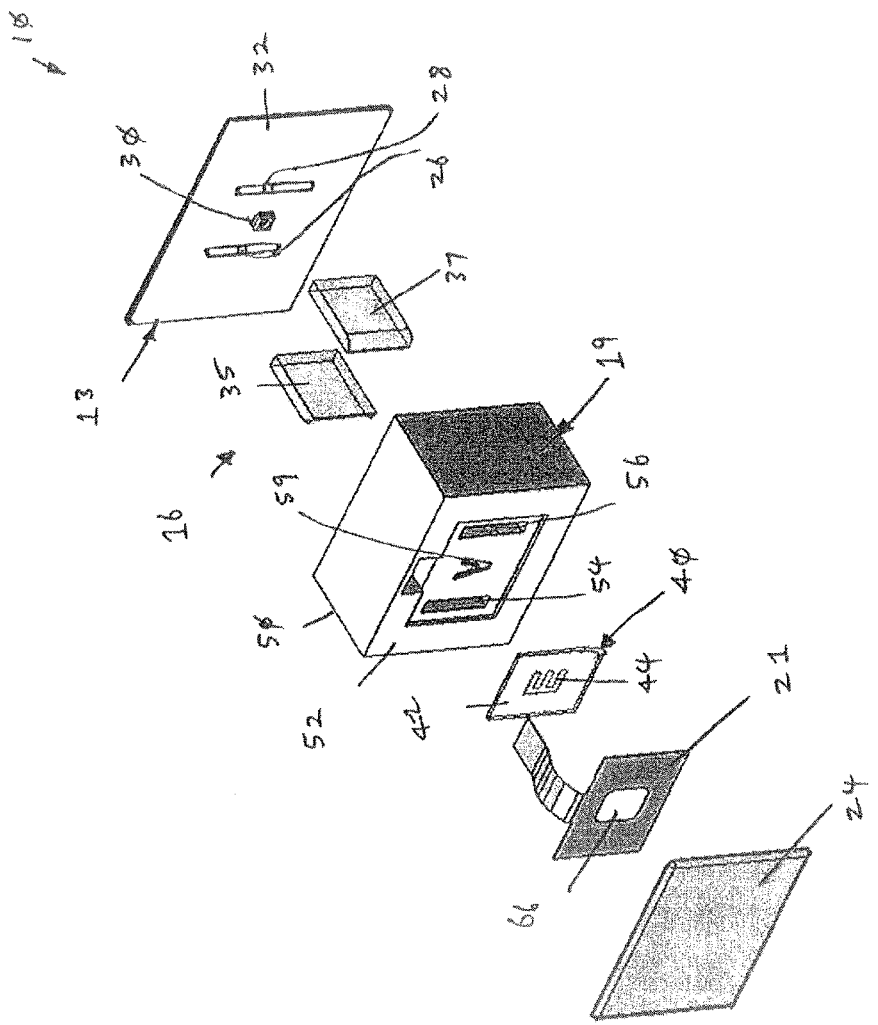
FIG. 1 illustrates an exploded view of a touch input front panel of a faceplate of a vehicle with a front smoked glass for displaying dual graphic patterns.

FIG. 1 shows a touch input front panel 10 for a faceplate or a center stack of a vehicle. The center stack is also called a center console.

The touch input front panel 10 comprises a light source module 13, a light guide module 16 with a textured surface for showing a first graphic pattern, an opaque carrier 19 with a cutout for showing a second graphic pattern, a capacitive touch sensor 21, and a smoked glass 24.

The light source module 13 is placed next to the light guide module 16 while a part of the light guide module 16 is inserted in the carrier 19. The carrier 19 is arranged next to the capacitive touch sensor 21 while the capacitive touch sensor 21 is next to the smoked glass 24.

In particular, the light source module 13 includes a first light guide Light Emitting Diode (LED) 26, a second light guide LED 28, and a carrier LED 30. The first light guide LED 26 and the second light guide LED 28 together with the carrier LED 30 are mounted on a printed circuit board (PCB) 32 while the carrier LED 30 is arranged between the two light guide LEDs 26 and 28.

The light guide module 16 has two source light guides 35 and 37 as well as a thin graphic light guide 40.

One end of the source light guide 35 is arranged next to the first light guide LED 26 while another end of the the source light guide 35 is arranged next to a first-end of the graphic light guide 40. Similarly, one end of the other source light guide 37 is arranged next to the second light guide LED 28 while another end of the the source light guide 37 is arranged next to a second-end of the graphic light guide 40.

Referring to the graphic light guide 40, it has an outer major surface that includes a smooth area 42 and a textured area 44. The textured area 44 is also called a light diffusion area. The textured area 44 has an uneven surface with a number of small portions, wherein the small portions have different in clinations. The textured area 44 has the shape of the letter "E". The smooth area 42 surrounds the textured area 44 and is arranged next to the textured area 44. The textured area 44 and the smooth area 42 are arranged on the side of the graphic light guide 40 that is facing the cutout 59. In other words, the textured area 44 and the smooth area 42 are pointing towards the cutout 59.

The opaque carrier 19 comprises a casing 50. The casing 50 has a flat outer surface 52, wherein two slots 54 and 56 together with a hollow cutout 59 are arranged on the outer surface 52.

The source light guides 35 and 37 are inserted respectively in the slots 54 and 56. The hollow cutout 59 has a shape of the letter "V" and is arranged in the vicinity of the textured area 44 of the graphic light guide 40.

Figure 2:
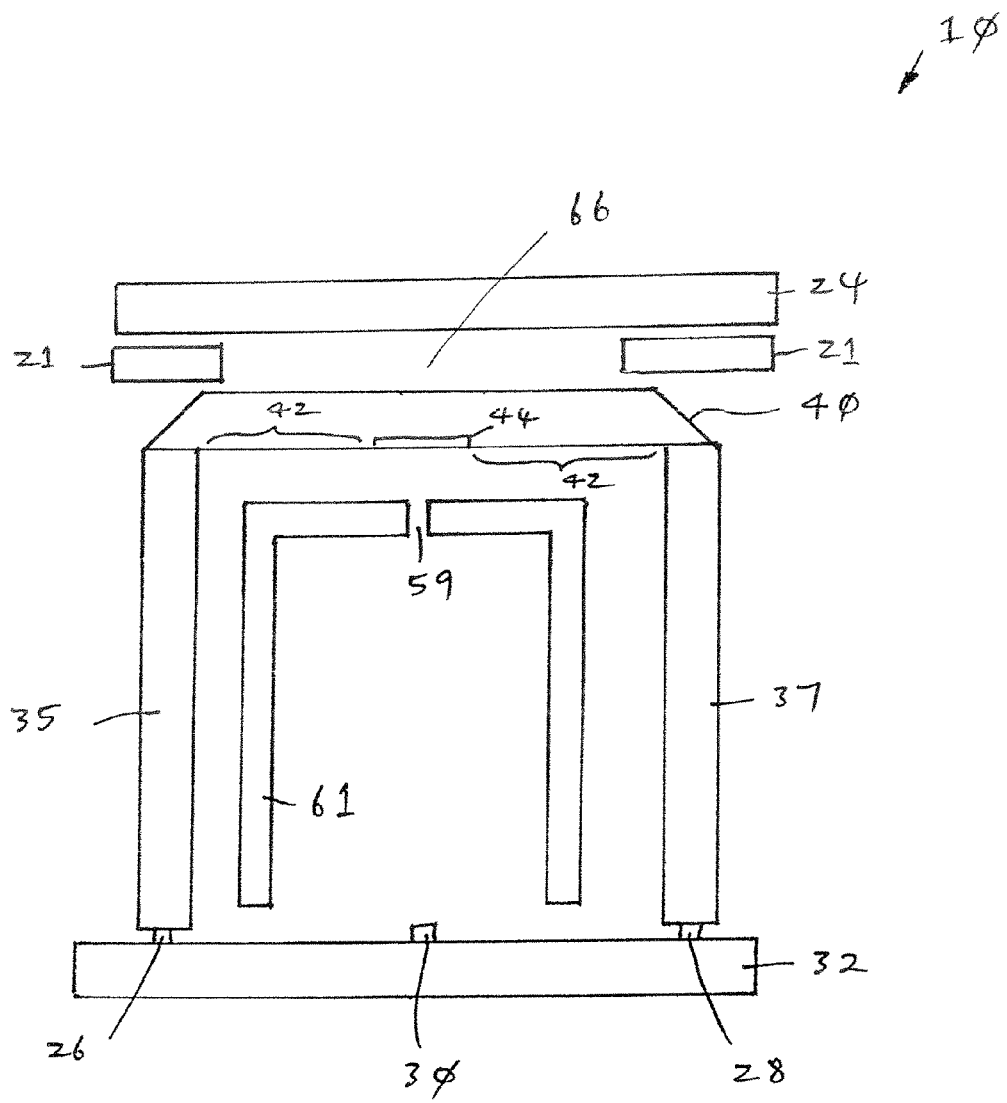
FIG. 2 illustrates a top sectional-view of the touch input front panel of FIG. 1.

As seen in FIG. 2, the casing 50 also has a light shield 61. The light shield 61 is arranged inside the casing 50 and it encloses the carrier LED 30.

The capacitive touch sensor 21 has a central hollow portion 66 that is arranged next to the textured area 44 of the graphic light guide 40, as shown in FIG. 1.

To produce the touch input front panel 10, the source light guides 35 and 37 as well as the thin graphic light guide 40 are molded from a clear optical grade material, such as Polymethyl Methacrylate (PMMA), acrylic resin, polycarbonate5 epoxies, and glass.

In particular, to produce the thin graphic light guide 40, a mold with internal smooth areas and with internal textured area is provided. A clear optical grade material is then heated and is injected into the mold, in which the mold shapes the material to form the thin graphic light guide 40. The internal smooth areas of the mold forms the smooth area 42 of the light guide 40 while the internal textured areas of the mold forms the textured area 44 of the light guide 40.

This method to produce the thin graphic light guide 40 has an advantage in that the thin graphic light guide 40 with its smooth area 42 and with its textured area 44 is produced in one step. This is unlike printing, in which the light guide is produced in a first step and its textured area is produced in a second step.

In a general sense, the textured area 44 can also be produced by other methods, such as etching the surface of the graphic light guide 40 with a chemical, laser, and Electrical Discharge Machining (EDM).

The opaque carrier 19 is molded from an opaque plastic material, such as Polycarbonate (PC) or Acrylonitrile Butadiene Styrene (ABS).

The smoked glass 24 is molded from a tinted plastic material. In use, the PCB 32 selectively energizes the first light guide LED 26, the second light guide LED 28, and the carrier LED 30.

When energized, the first light guide LED 26, the second light guide LED 28, and the carrier LED 30 emit light rays of the same red color.

Figure 3:
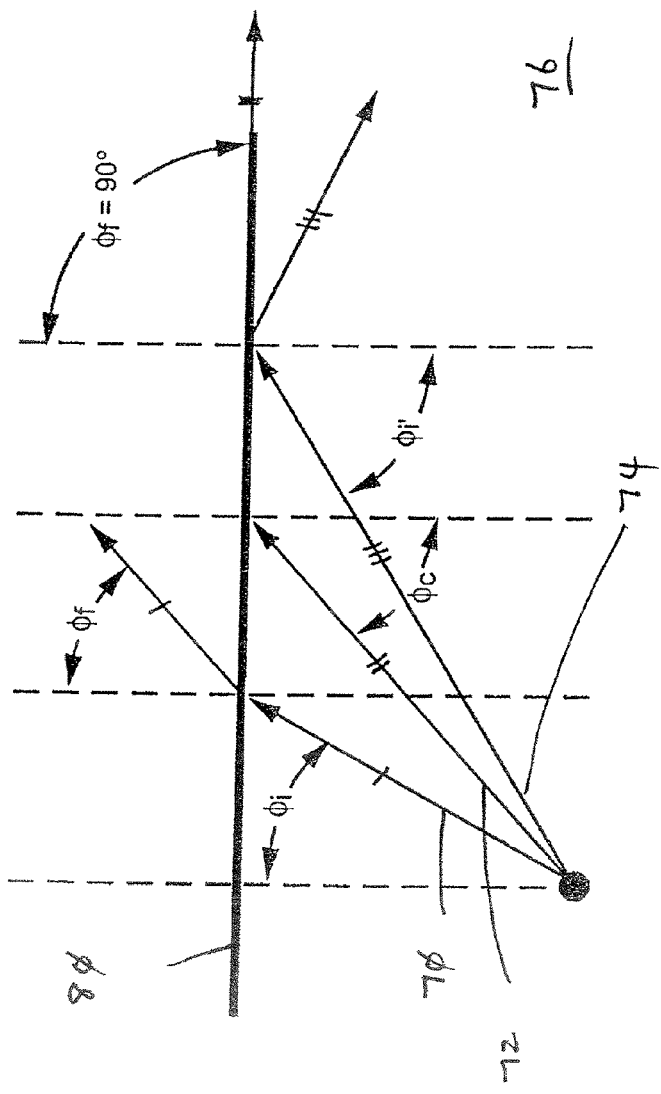
FIG. 3 illustrates paths of light rays of a light source of the touch input front panel of FIG. 1.

FIG. 3 shows different possible paths of light rays at a boundary between two optical mediums. FIG. 3 depicts light rays 70, 72, and 74 from a light source in a first medium 76 being directed to a second medium 78. The first medium 76 can refer to air while the second medium 78 can refer to a plastic layer.

The light rays 70, 72, and 74 are directed to a boundary 80 between the two mediums 76 and 78. The angles at which the light rays 70, 72, and 74 are directed at the boundary 80 are called incident angles $\varphi_i$.

In detail, the light ray 72 travels from the light source to the boundary 80 and the light ray 72 reaches the boundary 80 with a first incident angle $\varphi_i$ that is equal to a critical incident angle $\varphi_c$. The light ray 72 then exits the first medium 76 and then travels along the boundary 80.

Referring to the light ray 70, it travels from the light source to the boundary 80 and the light ray 70 reaches the boundary 80 with a second incident angle $\varphi_i$, which is less than the critical incident angle $\varphi_c$. The light ray 70 then leaves the first medium 76 and enters the second medium 78. In other words, the light ray 70 refracts at the boundary 80 when its incident angle is less than the critical incident angle $\varphi_c$. The angle at which the light ray 70 leaves the boundary 80 is called a refraction angle $\varphi_r$.

The light ray 74 travels from the light source to the boundary 80 and the light ray 74 reaches the boundary 80 with a third incident angle $\varphi_i$ that is more than the critical incident angle $\varphi_c$. The light ray 74 then leaves the boundary 80 and remains in the first medium 76. In other words, internal reflection of the light rays takes place. The light ray 74 reflects at the boundary 80 when its incident angle is more than the critical incident angle $\varphi_c$.

Referring to the source light guides 35 and 37 and to the graphic light guide 40, they act as a guiding device to couple effectively light rays from a light source into the guiding device with little optical loss. The guiding device formed by light guides 35,37 and 40 then transmits these light rays to an exit surface of the guiding device, thereby allowing the light rays to leave through the exit surface with little optical loss.

Figure 4:
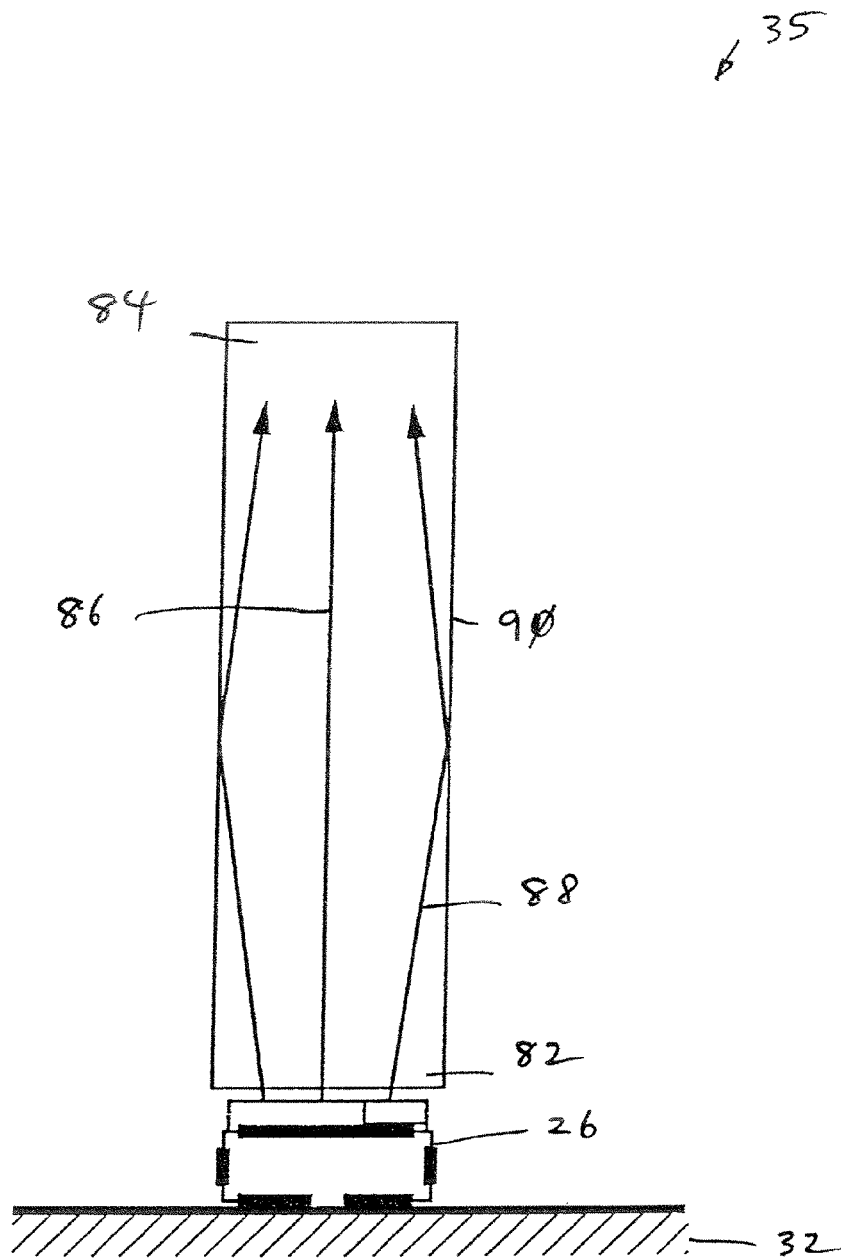
FIG. 4 illustrates paths of light rays of a source light guide of the touch input front panel of FIG. 1.

FIG. 4 shows paths of light rays of the source light guide 35.

The first LED 26 is positioned such that most light rays emitted by the first LED 26 are directed at a smooth first-end 82 of the source light guide 35.

The smooth first-end 82 is oriented such that most light rays from the first LED 26 illuminates the first-end 82 at incident angles $\varphi_i$ that are less than a first critical incident angle $\varphi_c$. This then causes these light rays to be refracted into the source light guide 35. In other words, most light rays that illuminate the first-end 82 also enter the source light guide 35.

The source light guide 35 allows most light rays to travel from the first-end 82 to a smooth second-end 84 of the source light guide 35 with little optical loss. The second-end 84 is arranged opposite to the first-end 82 and is also arranged next to the graphic light guide 40.

A portion 86 of these light rays from the first-end 82 travels directly to the second-end 84. Another portion 88 of these light rays from the first-end 82 travels to a longitudinal surface 90 of the source light guide 35 and is reflected towards the second-end 84.

These light rays reach the surface 90 at incident angles $\varphi_i$ that are more than a second critical incident angle $\varphi_c$, thereby allowing the longitudinal surface 90 to reflect these light rays towards the second-end 84.

Most light rays from the first-end 82 illuminate the smooth second-end 84 at incident angles $\varphi_i$ that are less than a third critical incident angle $\varphi_c$. Most of these light rays are later refracted and enter the graphic light guide 40.

In a special embodiment, the longitudinal surface 90 is coated with a reflective layer for reflecting the light rays towards the second-end 84 of the source light guide 35 to reduce optical loss.

In like manner, the second LED 28 emits light rays, wherein most of the light rays are directed at a smooth first-end of the source light guide 37. The source light guide 37 allows most light rays to travel from the first-end to a smooth second-end of the source light guide 37 with little optical loss. The second-end is positioned opposite to the first-end and is positioned next to the graphic light guide 40. Most light rays from the second-end also travel to the graphic light guide 40.

Figure 5:
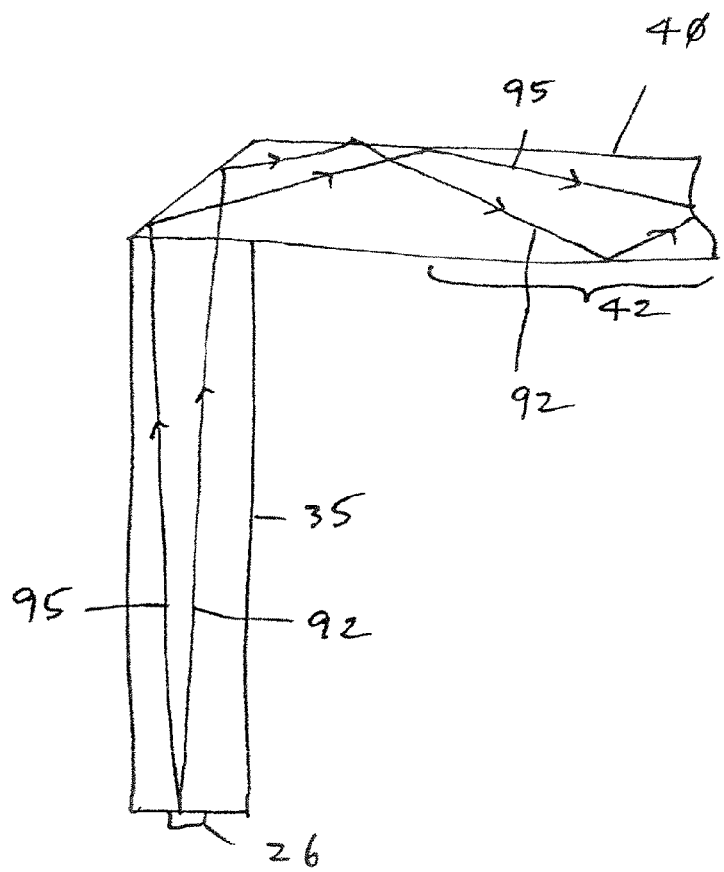
FIG. 5 illustrates a smooth surface of a graphic light guide of the touch input front panel of FIG. 1 reflecting light rays from a light source of the source light.

FIG. 5 shows the smooth area 42 of the graphic light guide 40 reflecting light rays 92 and 95 from the LED 26. These light rays 92 and 95 do not exit the graphic light guide 40 and remain in the graphic light guide 40.

The light rays 92 and 95 travel from the LED 26 to the source light guide 35 and to the graphic light guide 40. The LED 26, the source light guide 35 and the graphic light guide 40 are arranged such that these light rays 92 and 95 reach the smooth area 42 at incident angles $\varphi_i$ that are more than a particular critical incident angle $\varphi_c$. The smooth area 42 afterwards reflects these light rays 92 and 95.

No light rays or only some light rays from the graphic light guide 40 travel to the central hollow portion 66 or to the smoked glass 24. In short, none or some light rays from the LED 26 irradiate the smoked glass 24.

Figure 6:
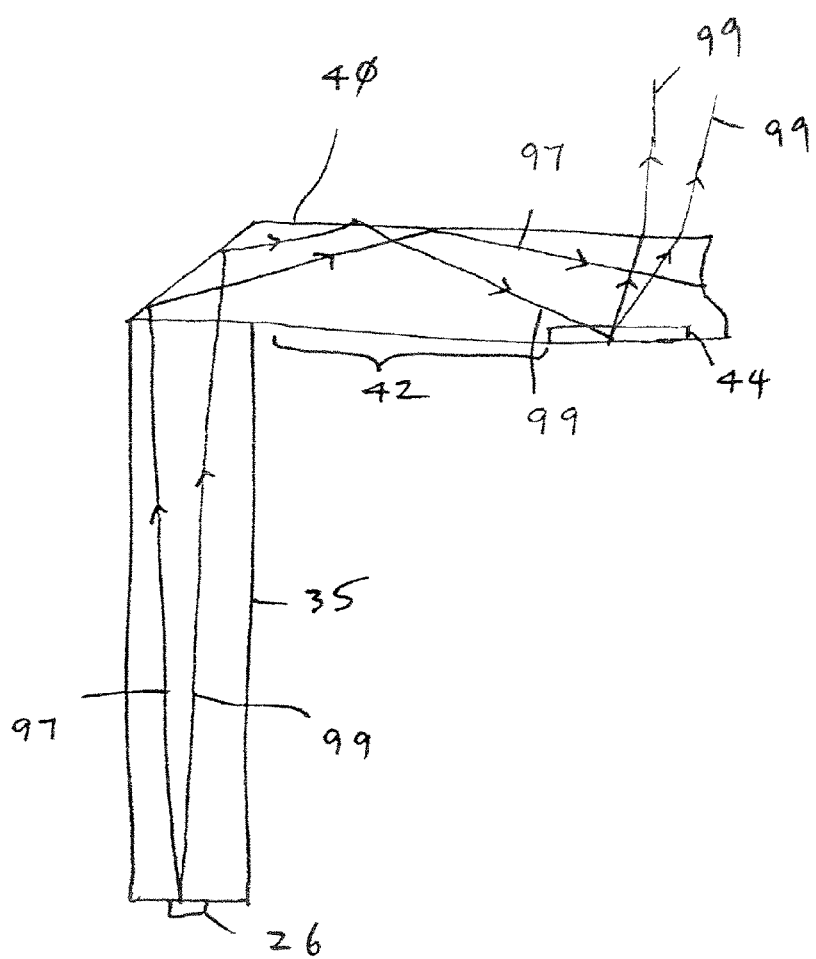
FIG. 6 illustrates a textured surface of the graphic light guide of the touch input front panel of FIG. 1 refracting light rays from a light source of the source light.

FIG. 6 shows the textured surface 44 of the graphic light guide 40 reflecting and scattering a light ray 99 that originates from the LED 26. These scattered light rays 99 then exit the graphic light guide 40.

The light ray 99 travels from the LED 26 to the source light guide 35 to enter into the graphic light guide 40. The light ray 99 later travels to the textured area 44, wherein the textured area 44 reflects the light ray 99.

The uneven surface of the textured area 44 then reflects and scatters the light ray 99 in different directions towards the central hollow portion 66 of the capacitive touch sensor 21. The scattered light rays 99 then exit the graphic light guide 40 with the shape of the letter "E", which is the shape of the textured area 44.

Figure 7:
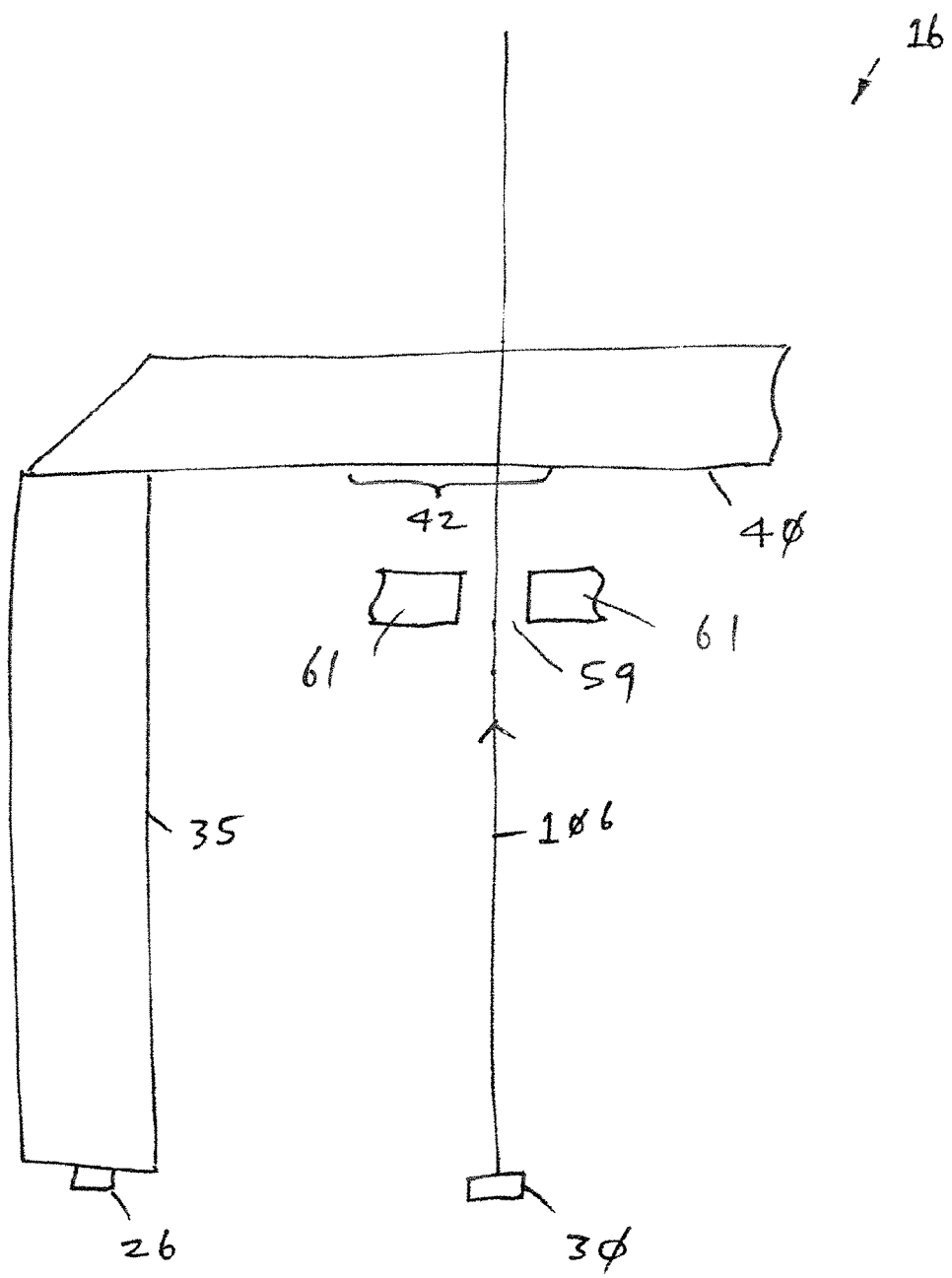
FIG. 7 illustrates the smooth surface of the graphic light guide of the touch input front panel of FIG. 1 reflecting light rays from a light source.

FIG. 7 shows the smooth area 42 of the graphic light guide 40 refracting a light ray 106 from the carrier LED 30. The light ray 106 then exits the graphic light guide 40.

A portion of the light-ray 106 is blocked by the light shield 61. In contrast, another portion of the light-ray 106 travels from the LED 30 to the cutout 59 and passes through the cutout 59 with shape of the cutout 59, which is the shape of the letter "V".

The light ray 106, which passes through the cutout 59, later hits the smooth area 42 of the graphic light guide 40. The LED 30, the cutout 59 and the graphic light guide 40 are arranged such that the light ray 106 reaches the smooth area 42 at incident angles $\varphi_i$ that are less than a particular critical incident angle $\varphi_c$. The smooth area 42 afterwards refracts the light ray 106 into the graphic light guide 40. The refracted light ray 106 then exits the graphic light guide 40 towards the hollow portion 66 of the capacitive touch sensor 21.

Figure 8:
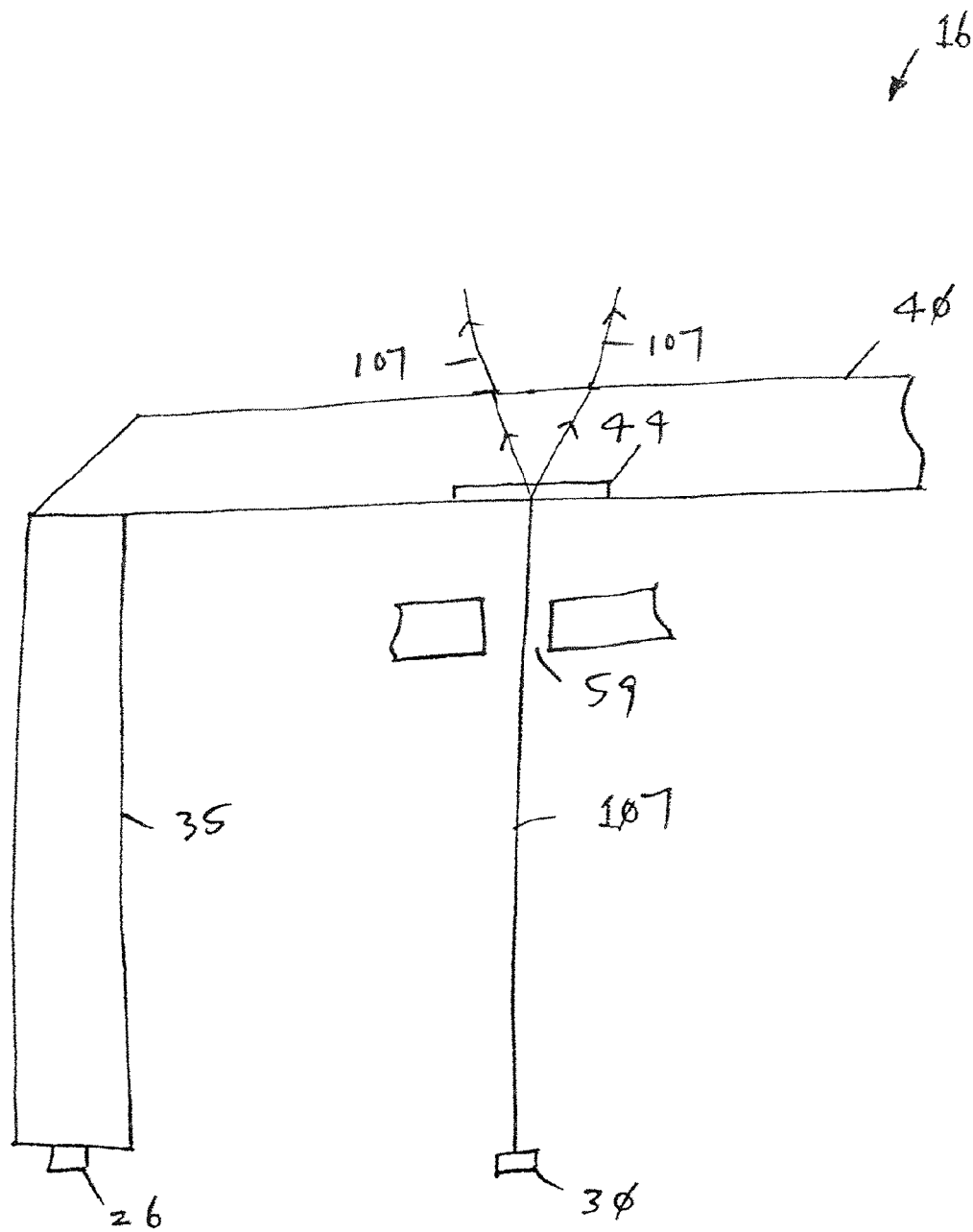
FIG. 8 illustrates the textured surface of the graphic light guide of the touch input front panel of FIG. 1 refracting light rays from the second light source.

FIG. 8 shows the textured surface 44 of the graphic light guide 40 refracting light rays 107 from the LED 30 in different directions.

The light ray 107 travels from the LED 30 to the cutout 59 and to the graphic light guide 40. The light ray 107 travelling so as to pass through the cutout 59 has the shape of the letter "V", which is the shape of the cutout 59. After this, the light ray 107 hits the textured area 44. The uneven surface of the textured area 44 then refracts and scatters the light ray 107 in different directions. The different directions of the refracted light rays 107 provide a high probability that some, if not most, of the refracted light rays 107 would later exit the graphic light guide 40 towards the hollow portion 66 of the capacitive touch sensor 21.

Referring to the capacitive touch sensor 21, it is used for detecting a touch from a user via the smoked glass 24, when the user touches the smoked glass 24 to indicate a selection of the user to a computer controller. The capacitive touch sensor 21 then generates a signal for sending to the computer controller to indicate to the selection.

Referring to the smoked glass 24, a portion of the light rays from the graphic light guide 40, which hits the smoked glass 24, transmits through the smoked glass 24 for viewing by a user of the touch input front panel 10. In this case, the smoked glass 24 allows about 30% of light rays to pass through. The smoked glass 24 also scatters the transmitted light rays to provide a wide radiation of the transmitted light rays.

In a general sense, the LEDs 26, 28, and 30 can each emit light rays of the same color or of different colors. Each LED 26,28, and 30 can be replaced by two or more light sources, which can be an LED light source. The LED 26 and 28 can each be epoxied respectively onto the light guide 35 and 37 for reducing optical loss.

The textured area 44 can be provided by a light ray diffusion film with an uneven surface, wherein the diffusion film is pasted or is attached to a surface of the graphic light guide 40.

The cutout 59 can have shapes other than that of the letter "V". The letter "V" is a form of a graphic pattern. Similarly, the textured area 44 can have shapes other than that of the letter "E". The letter "E" is also a form of a graphic pattern.

A method of using the touch input front panel 10 is described below. The method provides a non-display mode, a first display mode, a second display mode and an error display mode.

In the non-display mode, the LEDs 26, 28, and 30 are not energized and do not emit any light rays. This causes the smoked glass 24 to provide a dark display.

Figure 9:
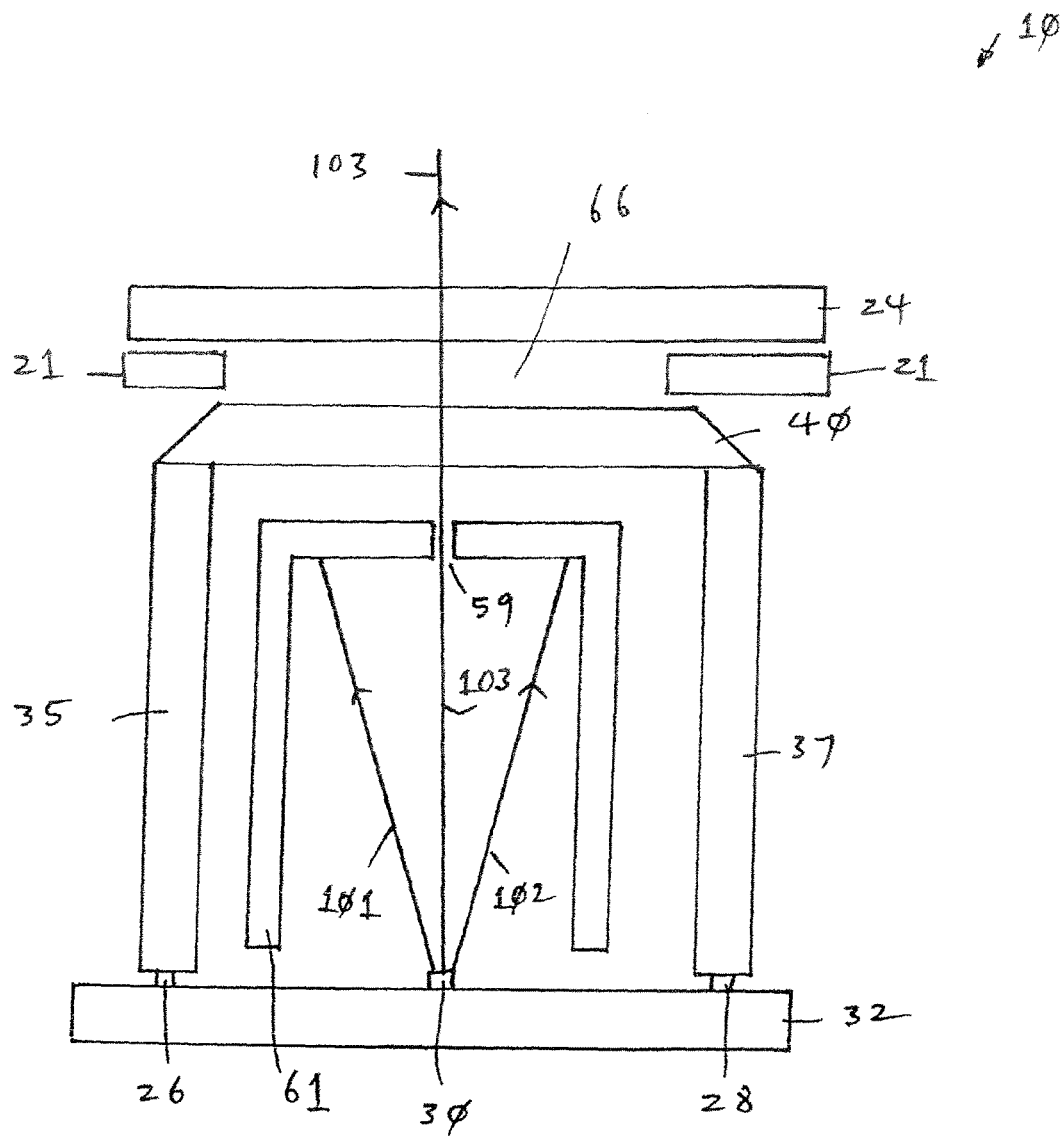
FIG. 9 illustrates a first display mode of the touch input front panel of FIG. 1 to show a first graphic pattern.

FIG. 9 shows the first display mode of the touch input front panel 10 to show a first graphic pattern, namely the letter "V".

In the first display mode, the carrier LED 30 is energized and it emits light rays 101, 102, and 103 while the LEDs 26 and 28 are not energized.

The opaque carrier 19 blocks the emitted light rays 101 and 102 such that only the light ray 103 that travels through the cutout 59 exits the carrier 19. The light ray 103 then has the shape of the letter "V", which is the shape of the cutout 59.

The light ray 103 then travels to the graphic light guide 40. A portion of the light ray 103 reaches the smooth area 40 while another portion of the light ray 103 reaches the textured area 44 of the graphic light guide 40. The portion of the transmitted light rays 103 that reaches the smooth area 40 is refracted into the graphic light guide 40. Most of the refracted light ray 103 then travel to exit the graphic light guide 40 for travelling towards the central hollow portion 66 to reach the smoked glass 24.

Similarly, the portion of the transmitted light rays 103 that reach the textured area 44 is also refracted in different directions into the graphic light guide 40. Most of the refracted light rays 103 then travel to exit the graphic light guide 40 for travelling towards the central hollow portion 66 to reach the smoked glass 24.

Figure 10:
FIG. 10 illustrates a front smoked glass of the touch input front panel of FIG. 1 displaying the first graphic pattern.

These light rays 103 then reach the smoked glass 24 to illuminate the smoked glass 24 with the letter "V". A portion of the light rays 103 then transmits through the smoked glass 24 to display the letter "V" to a user, as illustrated in FIG. 10.

Figure 11:
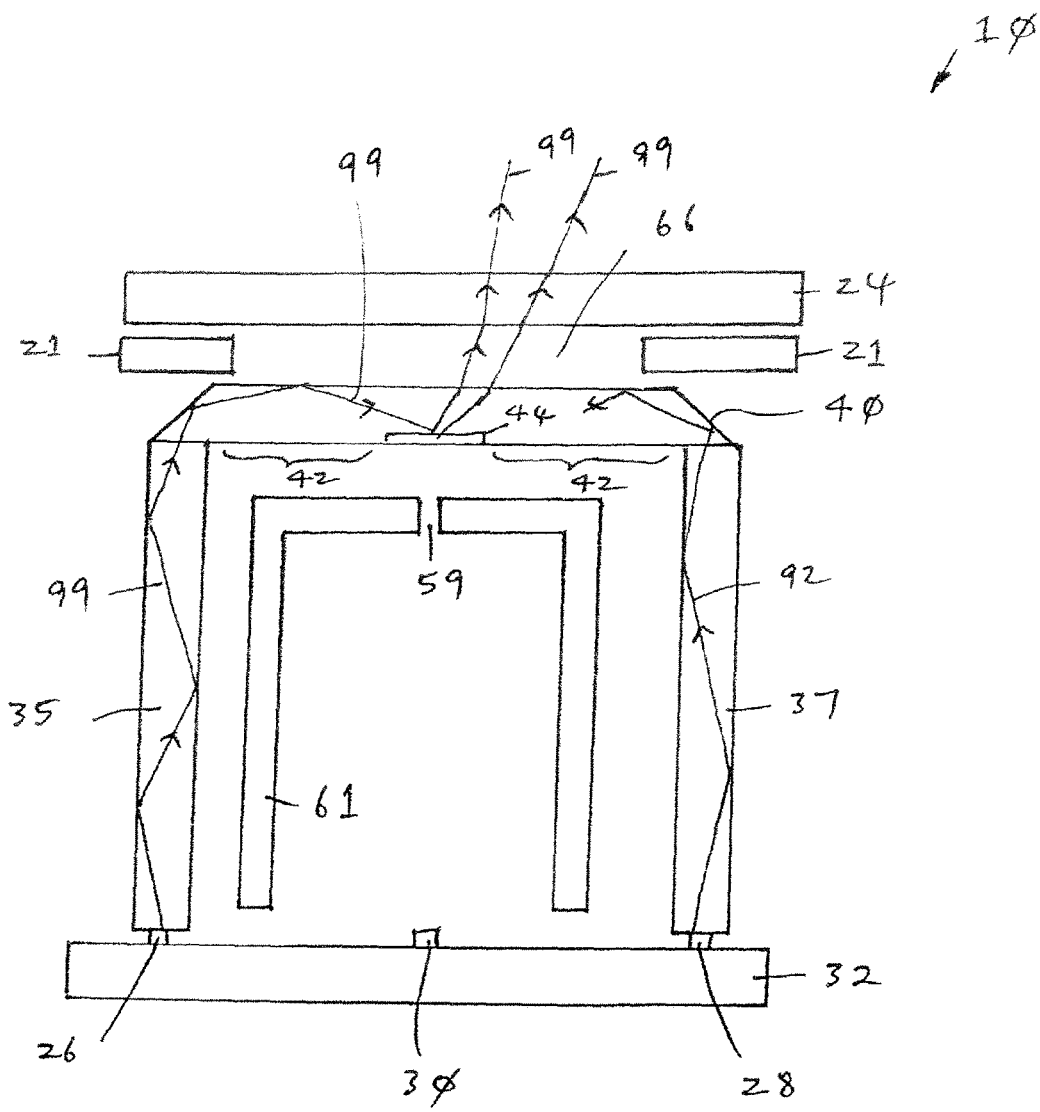
FIG. 11 illustrates a second display mode of the touch input front panel of FIG. 1 to show a second graphic pattern.

FIG. 11 shows the second display mode of the touch input front panel 10 to show a second graphic pattern, namely the letter "E".

In the second display mode, the carrier LED 30 is not energized while the LEDs 26 and 28 are energized.

The LEDs 26 and 28 then emit light rays 99 and 92, wherein most of the light rays 99 and 92 are transmitted to the source light guides 35 and 37.

The source light guides 35 and 37 afterward direct these light rays 99 and 92, respectively, to the graphic light guide 40 with little optical loss.

After this, the smooth area 42 of the graphic light guide 40 reflects the light ray 92, which hits the smooth area 42, such that most of the light ray 92 does not exit the graphic light guide 40. In other words, the smooth area 42 allows total internal reflection of the light ray 92.

Figure 12:
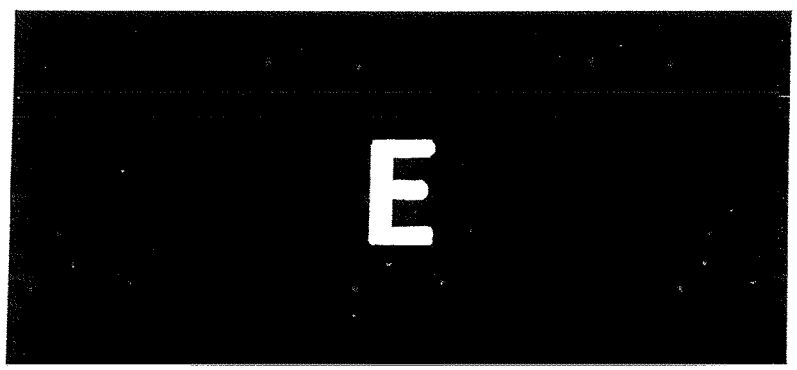
FIG. 12 illustrates the front smoked glass of the touch input front panel of FIG. 1 displaying the second graphic pattern.

In contrast, the textured area 44 of the graphic light guide 40 reflects the light ray 99, which hits the textured area 44, in different directions such that the entire reflected light ray 99 or a portion of the reflected light ray 99 exits the graphic light guide 40. The exiting light rays 99 have a shape of the letter "E", which is the shape of the textured area 44. These light rays 99 later reach the smoked glass 24 to illuminate the smoked glass 24 with the shape of the letter "E". A portion of the light rays 99 then transmits through the smoked glass 24 to display the letter "E" to a user, as illustrated in FIG. 12.

In the error display mode, all LEDs 26, 28, and 30 are energized at the same time such that they simultaneously emit light rays. This causes the smoked glass 24 to both display the letter "E" and the letter "V", which letter "E" overlaps the letter "V".

Figure 13:
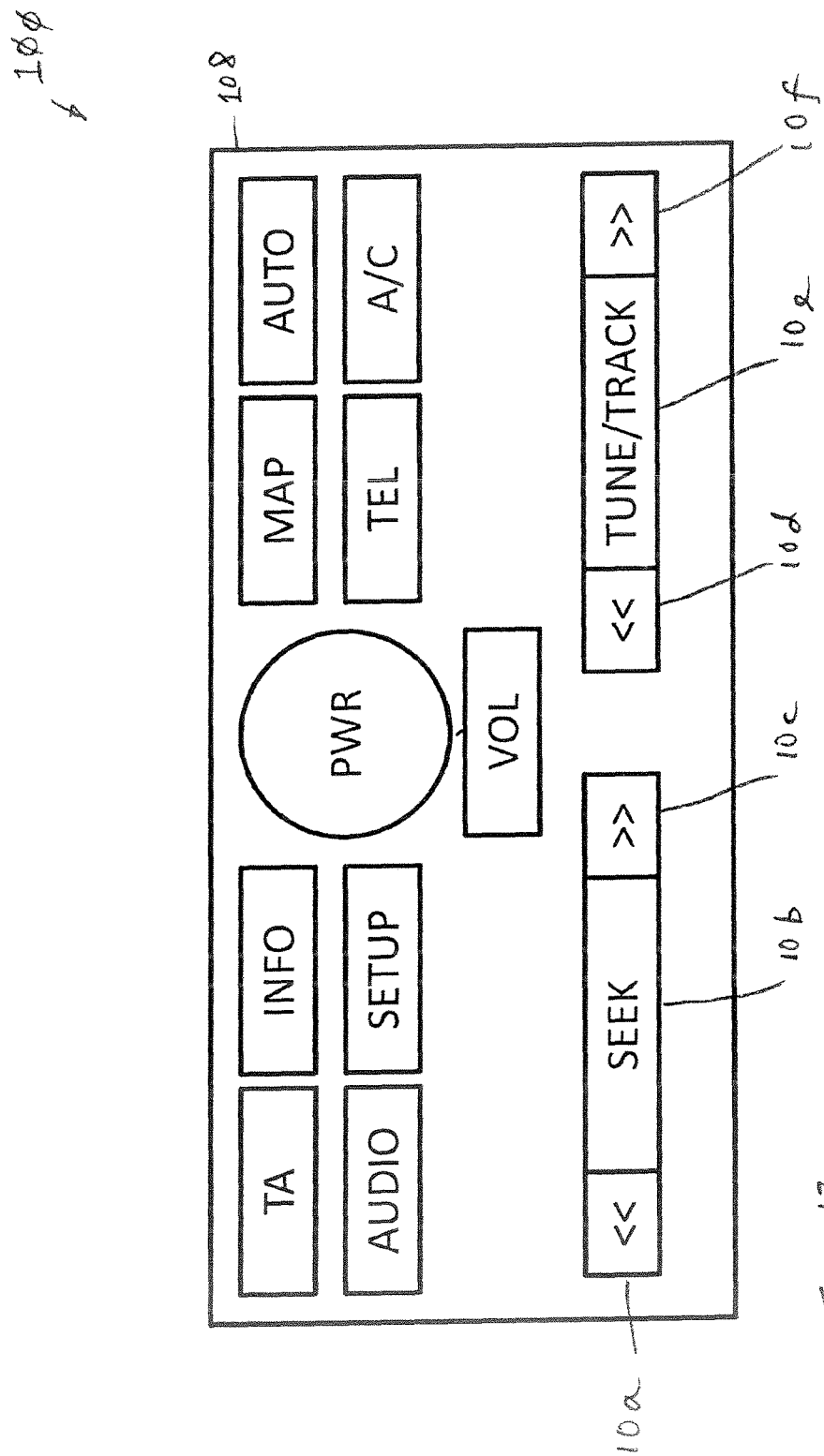
FIG. 13 illustrates a first display mode of a faceplate of a vehicle, the faceplate includes multiple touch input front panels of FIG. 1.
Figure 14:
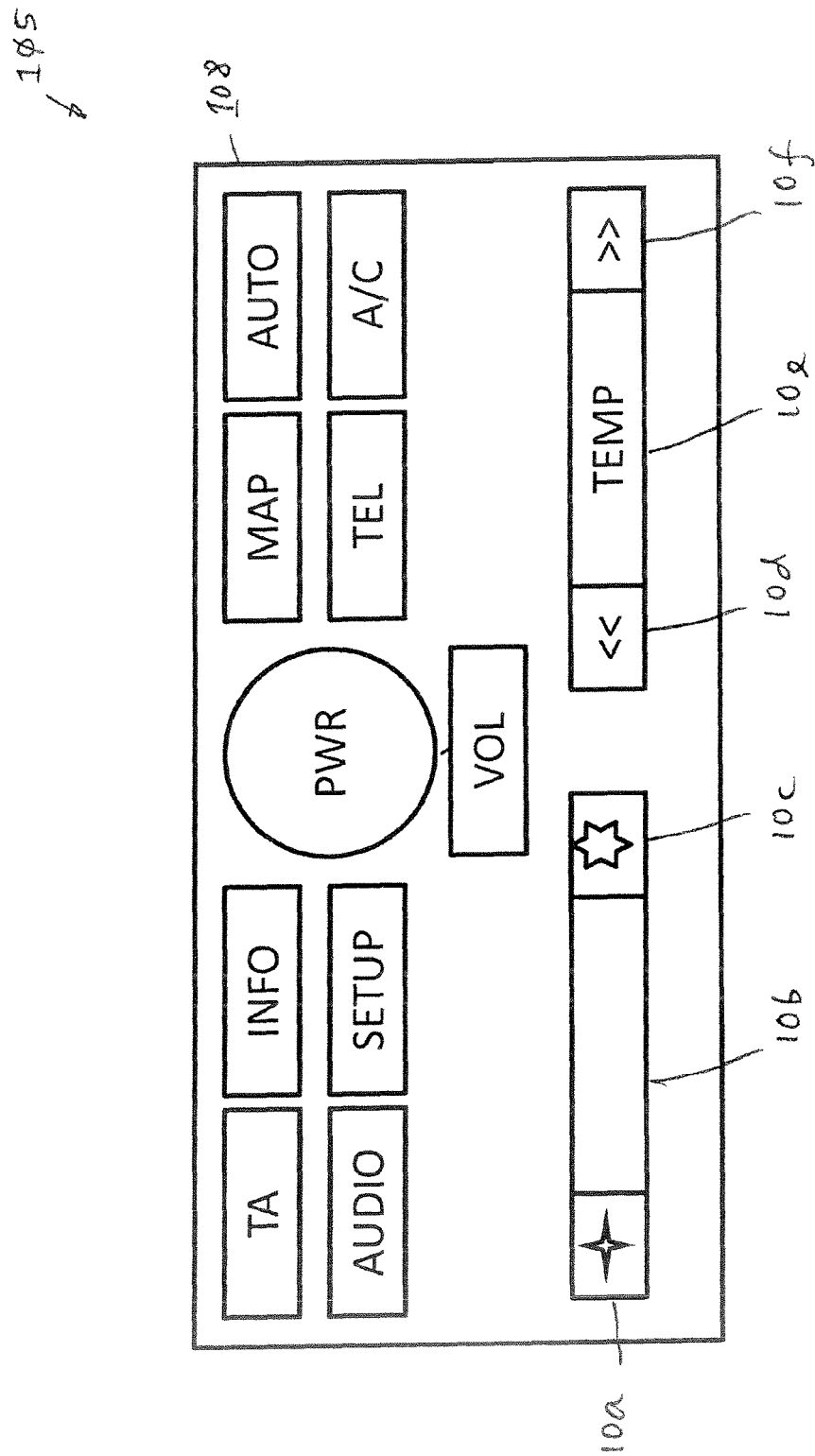
FIG. 14 illustrates a second display mode of the faceplate of FIG. 11.

FIGS. 13 and 14 show a faceplate of a vehicle displaying dual graphic patterns.

FIG. 13 shows a first display 100 of a faceplate 108 with multiple touch input front panels 10a-10f. In this figure, the illustrated display corresponds to a situation in which a user had previously pushed a button for showing audio functions, faceplate 108 showing the illustrated first display 100. In such a situation, the bottom part of the display 100 shows the front panels 10a-10f displaying several graphic patterns corresponding to various audio functions.

FIG. 14 shows a second display 105 of the faceplate 108. In this case, the display corresponds to a situation in which the user had pushed a button for showing climate control functions. In such a situation, the same faceplate 108 would show the second display 105, in which the bottom part of the display 105 shows the front panels 10a-10f displaying multiple graphic patterns corresponding to climate control functions.

Figure 15:
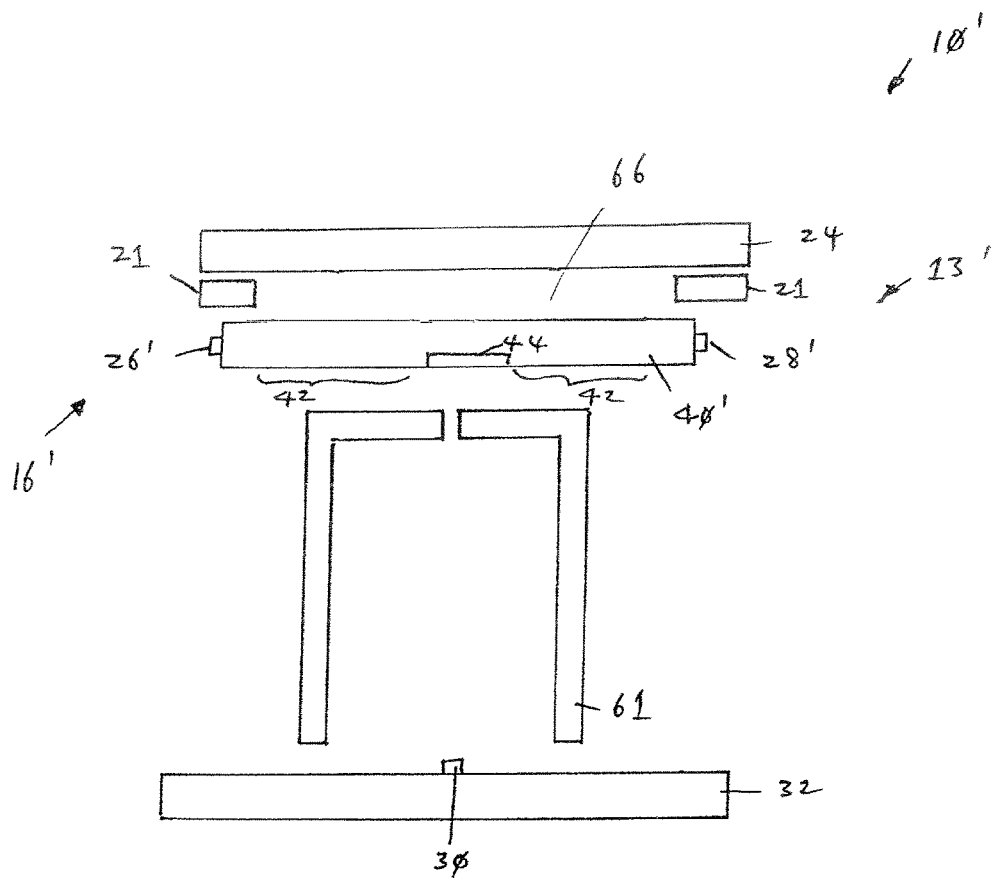
FIG. 15 illustrates a top sectional-view of another touch input front panel of a faceplate of a vehicle.

FIG. 15 shows another touch input front panel 10' for a faceplate or a center stack of a vehicle.

The touch input front panel 10' and the touch input front panel 10 have similar parts. The touch input front panel 10' includes a light source module 13' and a light guide module 16'. The light source module 13' includes a first light guide LED 26' and a second light guide LED 28'. The light guide module 16' has a thin graphic light guide 40', wherein the LED 26' and 28' are placed next to end portions of the light guide 40'.

Figure 16:
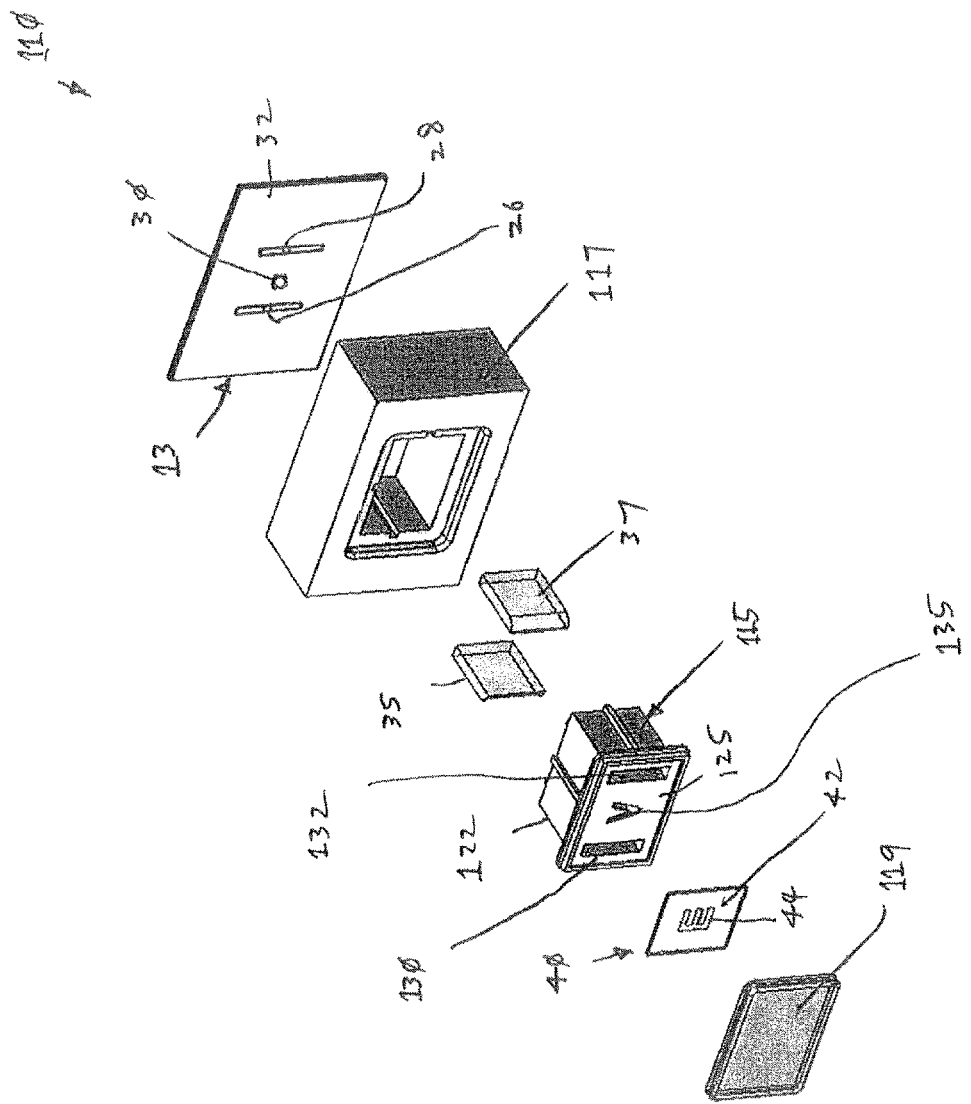
FIG. 16 illustrates an exploded view of a push button with a cover of a faceplate of a vehicle for displaying dual graphic patterns.

FIG. 16 shows a push button 110 for a faceplate or a center stack of a vehicle.

The push button 110 comprises a light source module 13, a light guide module 16, a button reflector 115, an opaque carrier 117, and a panel button cap 119.

The light source module 13 is placed next to the light guide module 16 and next to the carrier 117. The button reflector 115 is inserted in the carrier 117. A part of the light guide module 16 is inserted in the button reflector 115. The panel button cap 119 is placed near to the button reflector 115.

In particular, the light source module 13 includes a first light guide LED 26, a second light guide LED 28, and a carrier LED 30, which are mounted on a printed circuit board (PCB) 32. The light guide module 16 has two source light guides 35 and 37 as well as a thin graphic light guide 40. The light guide 40 has a textured area 44 with a shape of the letter "E" and a smooth area 42.

The button reflector 115 includes a casing 122. The casing 122 has a flat outer surface 125, wherein two slots 130 and 132 and a hollow cutout 135 are placed on the outer surface 1. The source light guides 35 and 37 are inserted in the respective slots 130 and 132. The hollow cutout 135 has a shape of the letter "V" and is placed next to the textured area 44 of the graphic light guide 40.

The panel button cap 119 covers the graphic light guide 40.

In use, a user selectively pushes the panel button cap 119 to indicate a user selection. The pushed panel button cap 119 also pushes the button reflector 115 to generate an actuation signal for sending to a computer controller to indicate reception of a button actuation from the user.

The panel button cap 119 also has a smoked glass or a smoked lens for illuminating by light rays from the graphic light guide 40 and light rays from the cutout 135. The panel button cap 119 allows a portion of these light rays to transmit for viewing by a user of the panel button cap 119.

A method of using the push button 110 is provided below. The method provides a non-display mode, a first display mode, and a second display mode.

In the non-display mode, the LED 26, 28, and 30 are not energized and do not emit any light rays. This causes the smoked glass 119 to provide a dark display.

In the first display mode, the carrier LED 30 is energized and it emits light rays while the LEDs 26 and 28 are not energized. The carrier 117 blocks the emitted light rays such that only light rays that travel through the cutout 135 exits the carrier 117. These light rays have the shape of the letter "V". These light rays then travel to the graphic light guide 40 and to the panel button cap 119 to display the letter "V".

In the second display mode, the carrier LED 30 is not energized while the LEDs 26 and 28 are energized. The LED 26 then emits light rays. Most of the light rays are transmitted to the source light guide. Similarly, the LED 28 emits light, wherein most of the light rays are transmitted to the source light guide 37. The source light guides 35 and 37 direct these light rays to the graphic light guide 40 with little optical loss. These light rays later reach the panel button cap 119 to display the letter "E" to a user of the push button 110.

Figure 17:
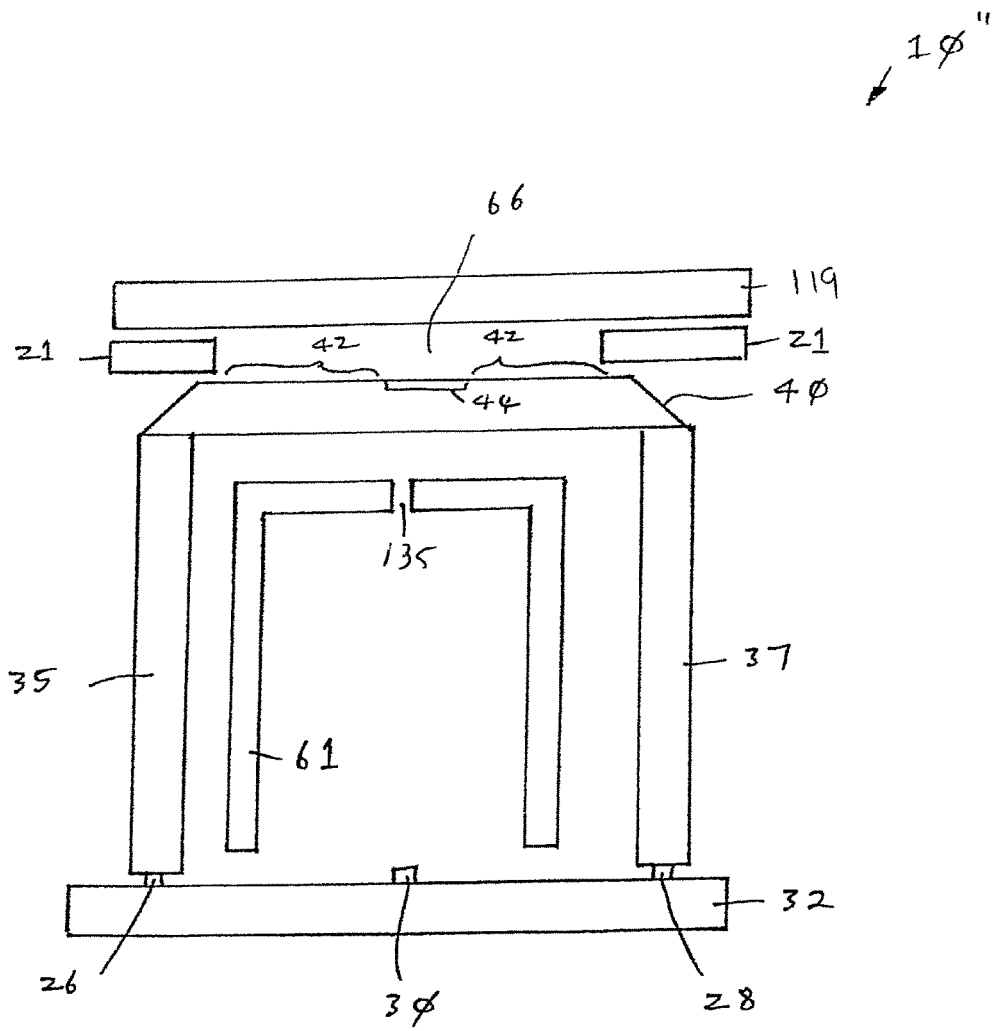
FIG. 17 illustrates a top sectional-view of a further touch input front panel, which is a variant of the touch input front panel of FIG. 1.

FIG. 17 shows a further touch input front panel 10'', which is a variant of the touch input front panel 10. The touch input front panel 10'' includes a graphic light guide 40 with a major surface that includes a smooth area 42 and a textured area 44. The textured area 44 and the smooth area 42 are placed on the side of the graphic light guide 40 that is facing a central hollow portion 66 of a capacitive touch sensor 21.

The embodiments can also be described with the following lists of features or elements being organized into items.

The respective combinations of features, which are disclosed in the item list, are regarded as independent subject matter, respectively, that can also be combined with other features of the application.

Item 1. A dual graphic label for an input element of a control device for selectively displaying a first graphic information and a second graphic information, the dual graphic label comprising a first light source for emitting a first light ray, a second light source for emitting a second light ray, an optical masking shield comprising a light blocking surface with a light permeable area in a shape of the first graphic information, a light conducting body comprising a surface with a light diffusion area in a shape of the second graphic information, and a display face, wherein the optical masking shield is provided between the first light source and the light conducting body, and the light conducting body is provided between the display face and the optical masking shield, wherein the first light ray travels from the first light source to the light permeable area of the optical masking shield, to the light conducting body, and to the display face for illuminating the display face with the shape of the first graphic information, and wherein the second light ray travels from the second light source to the light conducting body, through the light diffusion area, and to the display face for illuminating the display face with the shape of the second graphic information.

Item 2. The dual graphic label according to item 1, wherein the surface of the light conducting body comprises a smooth area that surrounds the light diffusion area.

Item 3. The dual graphic label according to item 1 or 2, wherein a first portion of the display face for illuminating by the first light ray with the shape of the first graphic information overlaps a second portion of the display face for illuminating by the second light ray with the shape of the second graphic information.

Item 4. The dual graphic label according to one of the above-mentioned items, wherein the color of the first light ray and the color of the second light ray are the same.

Item 5. The dual graphic label according to one of items 1 wherein the color of the first light ray and the color of second light ray are different.

Item 6. The dual graphic label according to one of above-mentioned items, wherein the light diffusion area faces the light permeable area.

Item 7. The dual graphic label according to one of the above-mentioned items further comprising a controller for selectively energizing the first light source and selectively energizing the second light source.

Item 8. The dual graphic label according to one of the above-mentioned items further comprising a light guiding unit being provided between the second light source and the light conducting body for guiding a light ray from the second light source to the light conducting body.

Item 9. The dual graphic label according to one of the above-mentioned items, wherein the light diffusion area comprises an etched area.

Item 10. The dual graphic label according to one of items 1 to wherein the light diffusion area comprises a light diffusion sheet.

Item 11. The dual graphic label according to one of the above-mentioned items, wherein
the display face is provided by a smoked optical element such as a smoked sheet or a smoked lens.

Item 12. The dual graphic label according to one of the above-mentioned items, wherein
the display face comprises light ray scattering elements.

Item 13. An input element of a control device comprising
a dual graphic label according to one of the above-mentioned items and
an input element for receiving a user input.

Item 14. The input element according to item 13, wherein
the input element comprises a mechanical button for providing inside the dual graphic label for receiving actuation by a user when the display face is pushed.

Item 15. The input element according to item 13 further comprising the input element comprises a capacitive touch sensor for providing inside the dual graphic label for detecting an actuation by a user when the display face is pushed.

Item 16. A faceplate for a vehicle, the faceplate comprising
at least one input element according to one of the above-mentioned items,
wherein the input element comprises a dual graphic label for selectively displaying a first graphic information and a second graphic information of the vehicle and comprises an input unit for receiving a user input.

Item 17. A vehicle comprising
at least two components, and
a faceplate according to item 16 being provided inside the vehicle, the faceplate comprises at least one input element,
wherein each input element is provided for selectively displaying a first graphic information of one component of the vehicle and a second graphic information of another component of the vehicle, and is provided for receiving a user input regarding the component.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A dual graphic label for an input element of a control device for selectively displaying a first graphic information and a second graphic information, the dual graphic label comprising:
a first light source configured to emit a first light ray;
a second light source configured to emit a second light ray;
an optical masking shield comprising a light blocking surface with a light permeable area in a shape of the first graphic information;
a light conducting body comprising a surface with a light diffusion area in a shape of the second graphic information;
a light guiding unit arranged between the second light source and the light conducting body, the light guiding unit being configured to guide a light ray from the second light source to the light conducting body;
an opaque carrier comprising a casing having an outer surface comprising the optical masking shield, wherein the light permeable area in the shape of the first graphic information comprises a hollow cutout in the outer surface of the opaque carrier in the shape of the first graphic information, the outer surface also comprising a slot into which the light guiding unit is insertable so as to couple the light guiding unit with the light conducting body;
and
a display face,
wherein
the optical masking shield is arranged between the first light source and the light conducting body, and the light conducting body is arranged between the display face and the optical masking shield,
the first light ray travels from the first light source to the light permeable area of the optical masking shield, to the light conducting body, and to the display face to illuminate the display face with the shape of the first graphic information, and
the second light ray travels from the second light source to the light conducting body, through the light diffusion area, and to the display face to illuminate the display face with the shape of the second graphic information.

2. The dual graphic label according to claim 1, wherein the surface of the light conducting body comprises a smooth area that surrounds the light diffusion area.

3. The dual graphic label according to claim 1, wherein the first light ray and the second light ray illuminate so that the shape of the first graphic information illuminated on a first portion of the display face overlaps with the shape of the second graphic information illuminated on a second portion of the display face.

4. The dual graphic label according to claim 1, wherein the color of the first light ray and the color of the second light ray are the same.

5. The dual graphic label according to claim 1, wherein the color of the first light ray and the color of the second light ray are different.

6. The dual graphic label according to claim 1, wherein the light diffusion area faces the light permeable area.

7. The dual graphic label according to claim 1, further comprising a controller configured to selectively energize the first light source and selectively energize the second light source.

8. The dual graphic label according to claim 1, wherein the light diffusion area comprises an etched area.

9. The dual graphic label according to claim 1, wherein the light diffusion area comprises a light diffusion sheet.

10. The dual graphic label according to claim 1, wherein the display face comprises a smoked optical element selected from the group of a smoked sheet and a smoked lens.

11. The dual graphic label according to claim 1, wherein the display face comprises light ray scattering elements.

12. An input element of a control device comprising:
a dual graphic label according to claim 1; and
an input element configured to receive a user input.

13. The input element according to claim 12, wherein the input element comprises a mechanical button arranged inside the dual graphic label and configured to receive an actuation by the user when the display face is pushed.

14. The input element according to claim 12, wherein the input element comprises a capacitive touch sensor arranged inside the dual graphic label and configured to detect an actuation by the user when the display face is pushed.

15. A faceplate for a vehicle, the faceplate comprising:
at least one input element according to claim 12,
wherein the input element comprises:
  a dual graphic label configured to selectively display a first graphic information and a second graphic information of the vehicle, and
  an input unit configured to receive a user input.

16. A vehicle comprising:
at least two components; and
a faceplate according to claim 15 arranged inside the vehicle, the faceplate having at least one input element,
wherein each at least one input element is configured to:
  selectively display a first graphic information of one component of the vehicle and a second graphic information of another component of the vehicle, and
  receive a user input regarding the one component.

* * * * *